W. RICHMOND.
ELECTRIC COOKER.
APPLICATION FILED OCT. 24, 1911. RENEWED OCT. 12, 1916.
1,208,213.
Patented Dec. 12, 1916.
2 SHEETS—SHEET 1.
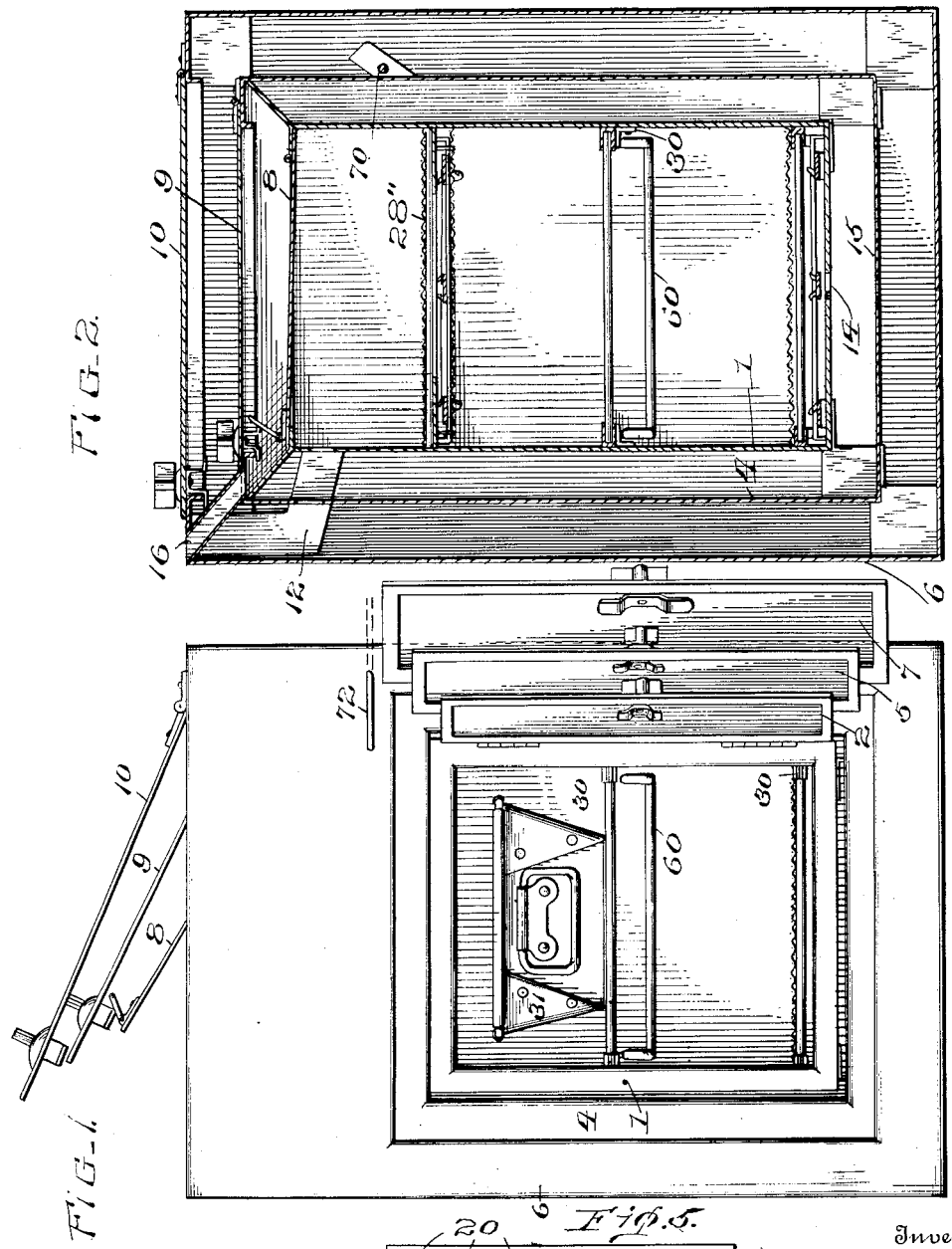
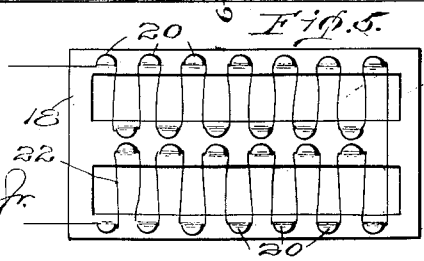

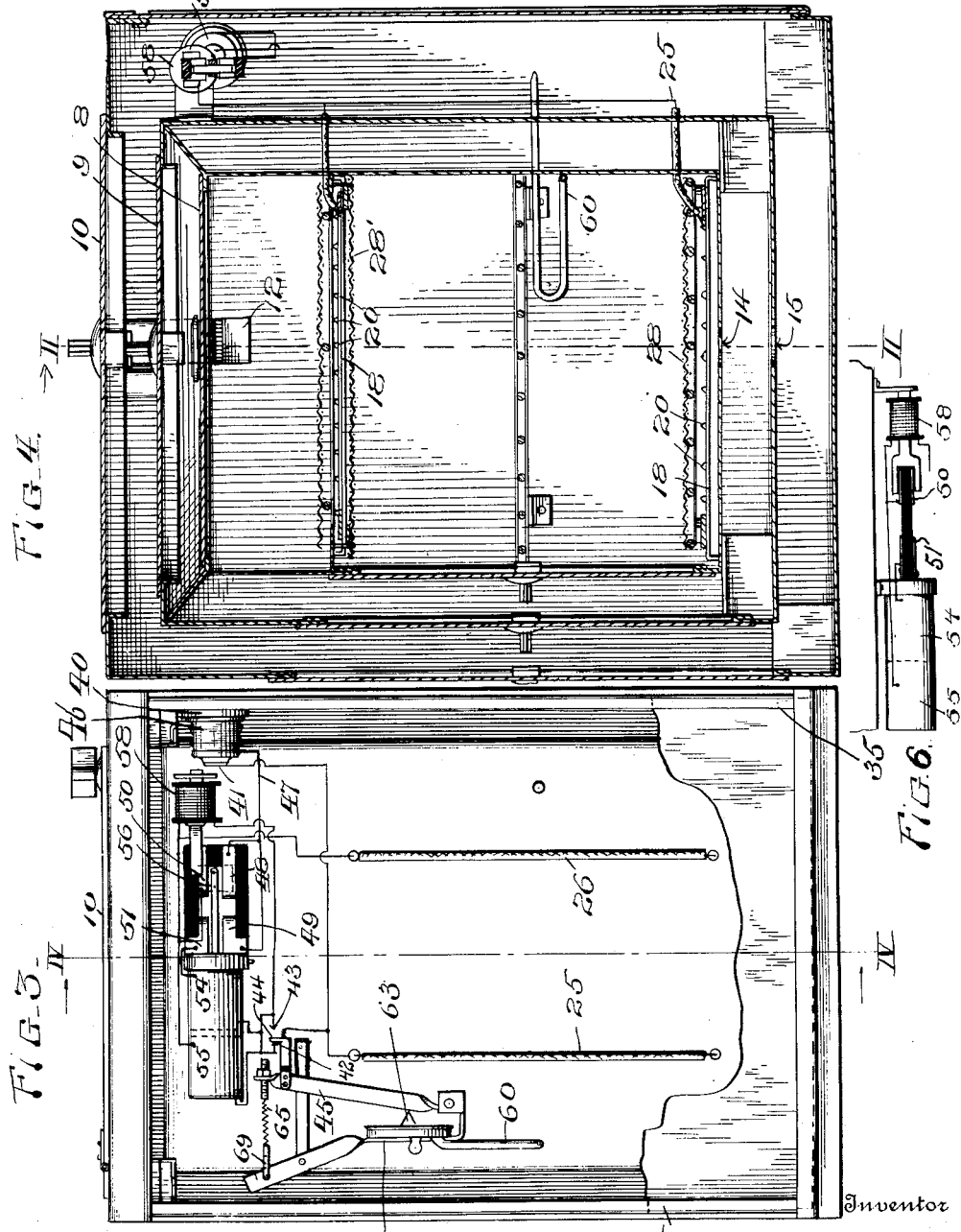

UNITED STATES PATENT OFFICE.

WALTER RICHMOND, OF MEMPHIS, TENNESSEE, ASSIGNOR TO JOHN ELLIOTT JENKINS, OF CHICAGO, ILLINOIS.

ELECTRIC COOKER.

1,208,213.      Specification of Letters Patent.      Patented Dec. 12, 1916.

Application filed October 24, 1911, Serial No. 656,431. Renewed October 12, 1916. Serial No. 125,335.

*To all whom it may concern:*

Be it known that I, WALTER RICHMOND, a citizen of the United States, residing at Memphis, in the county of Shelby and State of Tennessee, have invented new and useful Improvements in Electric Cookers, of which the following is a specification.

My invention relates to electrical cooking apparatus, and has for its general object to provide a highly efficient cooker in which the heat is directly radiated from the heating coils and the oven is effectively insulated to conserve the heat.

Another object of the invention is to provide an electrical cooking apparatus in which the moisture arising from articles being baked may be removed without subjecting the oven to a chill or exposure, and in which the oven may be gradually cooled without sudden chilling or direct exposure.

A further object of the invention is to provide a cooker which is adapted to broiling and frying as well as to baking or roasting, and in which the degree of heat or range of temperature may be changed at will, while at all times under automatic thermostatic control.

Other objects of the invention will be apparent from the following description taken in connection with the accompanying drawings, in which—

Figure 1 is a front elevation of an electric cooker embodying my invention, the doors being open to expose the interior; Fig. 2 is a vertical cross section on the line II—II of Fig. 4; Fig. 3 is a rear elevation, with the rear wall partly broken away to expose the connections with the heater coils and the automatic heat-control apparatus; Fig. 4 is a vertical section on the line IV—IV of Fig. 3; Fig. 5 is a perspective view of one of the heating units; and Fig. 6 is a detail view of the relay and blow-out magnet.

My electrical cooking apparatus comprises an oven 1, incased in a duplex heat-insulating casing formed of an inner wall 4 and an outer wall 6. The walls of the oven and the duplex insulating casing are spaced from each other in order to include dead air spaces, and the walls are preferably constructed of sheet metal having polished surfaces, inasmuch as the latter reflect the heat but retard the radiation thereof. The air chambers between the several walls effectually insulate the oven from the outside temperature and prevent the radiation loss of heat. By my arrangement of ducts and ports, hereinafter described, I am enabled to gradually cool the oven when desired, without subjecting it to chilling drafts or sudden changes of temperature, which is exceedingly important in cooking apparatus.

The doors 2, 5 and 7, which close and effectually seal the oven and insulating chambers are arranged, as shown in Fig. 1, so that they may be opened at one side of the cooker, thus giving ready access to the oven, and they are provided with suitable locking or fastening devices. The top of the oven and the two insulating chambers are likewise provided with registering openings which are closed by hinged lids 8, 9, and 10.

The baking of moist articles may be logically considered as divided into two stages In the first stage the moisture is driven off, and in the second stage the true baking or conversion to new form by high temperature is accomplished. In the first stage the escape of moisture by evaporation limits the temperature usefully applied, and at the same time calls for a large quantity of heat or a great number of thermal units. After the expulsion of moisture and consequent cessation of absorption of latent heat by evaporation, the process of baking takes on a different aspect. It is apparent that there should be provided some means for withdrawing the moisture during the initial stage of the baking, in order to carry on the process efficiently and under the best conditions, but it is also apparent that the heat must be conserved and the radiation prevented.

My present invention provides a means for withdrawing the moisture of evaporation during the initial stage of baking and at the same time effectually maintaining the heat of the oven. To this end I provide a vent tube 12 leading from the top of the oven and a port or vent 14 in the bottom thereof. It is evident that as long as the doors 2, 5, and 7 are tightly closed, no air currents can pass into or out of the oven. In order to effect a slight air current sufficient to carry off the moisture from the oven, I provide a small opening or port 15 in the bottom of the intermediate wall and preferably in alinement with the oven port 14. Now upon opening the outer door 7, the other doors remaining tightly closed, a current of air will circulate upwardly through the intermediate chamber and into the oven, thereby causing a circulation which passes out of the vent tube 12. This air-circulation is controlled by the amount of the opening through the door 7, and may be regulated so that only a slight air current will be produced, sufficient only to carry off the vapors of the oven without chilling it. The outer door 7 thus constitutes a valve for controlling the vent 14 in the bottom of the oven. Moreover, the air which passes into the oven is received from the intermediate chamber where the temperature is fairly high and the walls of the oven upon all sides are protected from any chill by the insulating intermediate chamber. If desired, a slide or valve may also be placed over the port 15, although in practice I have found this to be unnecessary. For the purpose of carrying off any vapors which may pass above the oven lid 8, I provide a vent-tube 16, which passes below the intermediate lid 9. It will now be apparent that my system of insulating chambers combined with the vents and ports provides an exceedingly effectual cooker.

The electric heating units are placed in the bottom and in the upper portion of the oven, and the heating or resistance wires are bare or uninsulated and radiate directly into the oven, an arrangement which I have found to be far more efficient than the inclosed or indirect radiation heaters. I have shown my preferred form of heater in Fig. 5. It consists of a skeleton metal frame 18 having tongues or prongs 20, struck up to form hooks or fastenings for the resistance wire 22, which is wound back and forth in zigzag manner thereon. After the tongues have been formed, the entire frame 18 is enameled and thus constitutes an insulating base upon which the bare wire may be supported. The end portions of the bare resistance wire 22, thus comes into direct contact with the central and side strips of the metal frame 18, so that the latter becomes heated by conduction, and in turn, distributes and radiates the heat, thereby causing a more even distribution of heat to the surrounding air. The terminals of each of the heating units are connected to the conductors 25, 26, which are connected through the current-regulator with the main current leads. By providing a direct-radiation heater in the top as well as in the bottom of the oven, I am enabled to secure a very uniform temperature and to avoid the difficulty so often experienced in baking ovens, of unequal temperatures above and below the article being baked. The heaters are protected from contact with the cooking utensils by means of wire screens 28, 28'. The walls of the oven may be provided with lugs 30, to receive shelves or racks which support the baking utensils such as 31.

When it is desired to fry or boil materials the lids 8, 9, 10, are raised and the cooking vessel or utensils are lowered over the wire screen 28'' which rests directly above the upper heating unit, so that the vessel will receive the intense heat radiation from the hot resistance wire. The lids can then be closed during the frying or boiling process if desired to retain the heat. Inasmuch as the heat required for frying is greater than for baking, I provide means for increasing the heat of the upper heater whenever desired, as will be hereinafter explained. If desired, cooking operations may take place simultaneously in the upper compartment and in the oven.

One of the objects of my invention is to provide an automatic heat regulator which will accurately control the temperature of the oven. For this purpose, I provide the apparatus illustrated in Fig. 3, and which is located in the outer chamber upon the rear of the intermediate wall. In order to give access thereto for inspection or examination, the rear wall of the outer casing may be arranged to slide in guides or channels 35, so that the entire end of the outer chamber may be exposed.

A standard connection-socket 40, adapted to receive the plug contacts from the electric mains, is placed in the outer wall. One of the contacts 41 connects directly with the conductor 25 leading to one side of each of the heater coils, and also to the central reciprocatory contact 44 carried by the pivoted arm 45 of the thermostatic switch. The other plug contact 46 forming the inwardly extending wall of the socket 40 is connected by wire 47 to the spring contacts 48 and 49 of the electro-magnetic relay. The spring contact 50 is connected to the conductor 26, connected to one terminal of each of the heater coils. The relay is provided with two coils 54, 55, which are alternately energized to move the core connected with the switch blade 56 and shift it from one pair of spring contacts to the other. The coil 54 is connected to spring contact 51 and contact 42 of the thermostatic switch; and the coil 55 is connected to the switch contact 43 and to the spring contact 50. The blow-out magnet 58 is connected in shunt to the relay coil 55.

The manner of regulating the temperature in the oven is as follows:—I employ a thermostat of the fluid expansion type, having a tube 60 extending across one side of the oven, one end being closed and the other end opening into an expansion box 61, the front of which serves as a diaphragm carrying an anvil 63 which bears against the pivoted arm 45. When the temperature in the oven is below the critical temperature at which the thermostat operates, the switch arm 45 will be held by the spring 65 with the contact 44 against the contact 42, thereby connecting the coil 54 momentarily in circuit and causing the switch blade 56 to move outwardly into engagement with spring contacts 48 and 50, thereby connecting the heater coils to the mains. The movement of the blade from the inner spring contacts to the outer spring contacts breaks the circuit of the coil 54, and the arc at the contacts which tends to maintain the circuit is blown out by the magnetic field of the relay coil 54. The relay coils are wound with comparatively large wire so that the resistance of the coil is small, thereby permitting a current of large amperage to flow and producing a very powerful pull upon the core. This is essential to insure the complete entrance of the blade within the spring contacts at either end of its throw or travel. The heaters will remain in circuit until the oven becomes heated to the predetermined maximum temperature. As soon as the critical predetermined temperature is reached, the fluid in the tube 60 expands and forces the diaphragm outwardly, causing the anvil 63 to move the switch arm 45 and bring the contact 44 into engagement with the contact 43. This closes the circuit through the relay coil 55, and causes the core to shift and move the switch blade 56 into engagement with the spring contacts 49, 51, thereby cutting out the oven heating coils and breaking the circuit of the coil 55. As the blade 56 leaves the spring contact 50, the arc which follows will be extinguished by the blow-out magnet 58. The heater coils will remain out of circuit until the oven cools sufficiently to permit the fluid in the tube 60 to condense, thereby releasing the pressure in the box 61 and allowing the spring 65 to shift the contact arm 45, thus changing the connections of the relay which in turn again connects the heater coils to the mains.

It is desirable that the temperature for frying should be greater than for baking, and therefore when it is desired to use the upper heater for frying I have arranged to change the tension upon the thermostatic switch so that it will require a higher critical temperature to move the switch arm 45. The retractile spring 65 is secured to a lever-arm 69 carried by a rod or arbor 70, and is provided with an operating handle 72, projecting from the front wall of the outer casing. Now by turning the handle 72 into the dotted line position, the lever 69 will be swung over into a position to increase the tension upon the spring 65. The amount of this increased pull of the spring upon the arm 45 may be adjusted so that it will require any desired increase of temperature in the oven to be reached before the fluid pressure in the tube 60 and box 61 will cause the anvil 63 to throw the arm 45 over against the spring tension. It will be seen, therefore, that I have provided a device for instantly changing the predetermined critical temperature at which the thermostatic switch will operate. An additional coil may be connected to the frying heater if desired to intensify the heat.

The advantages of my electric cooker will be appreciated by those familiar with this art. My arrangement of insulating air chambers and ducts provides for the efficient conservation of heat and yet permits the withdrawal of the moisture and vapors during certain stages of the baking process. I am also enabled to gradually reduce the temperature without exposing the oven to drafts or any sudden chilling. The arrangement of the bare resistance coils within the oven effects a great economy in the current required to produce the heat, due to the direct radiation, while the polished metal walls reflect the heat within the oven and retard the radiation upon the outer surfaces thereof. Another peculiar advantage resides in the provision of means for regulating the temperature of the oven and for instantly changing the range of temperature or the critical predetermined temperature. The particular construction of the relay by which it will operate equally well upon either direct or alternating currents is claimed in my copending application, Serial No. 656,430.

I have described in detail the structure illustrated in the accompanying drawings for the purpose of disclosing an embodiment of my invention, but many changes may be made therein without departing from the spirit of my invention.

I claim:—

1. An electric cooker comprising an oven and a duplex casing spaced from said oven and providing a plurality of insulating chambers, electric heating coils within said oven, an outlet vent connected with said oven, and an inlet port or opening connecting said oven with the inner chamber of said casing.

2. An electric cooker comprising an oven and a duplex casing spaced from said oven and providing a plurality of insulating chambers, electric heating coils within said oven, an outlet vent connected with said oven, an inlet port or opening connecting said oven with the inner chamber of said casing, and a port connecting the intermediate chamber with the outer chamber thereof.

3. A cooker comprising an oven, a plurality of spaced walls forming heat insulating chambers surrounding said oven, electric heating coils within said oven, and means for ventilating said oven while maintaining the adjacent surrounding chamber closed.

4. An electric oven, comprising a casing vented through its top and bottom, means for controlling the air vent in the bottom of the casing, a resistance wire within the oven and constituting the heater, a switch in circuit with said resistance-wire, and automatically-operating means for opening the switch.

5. In an oven, a casing divided into a plurality of chambers, suitable heaters arranged therein, and heat insulating walls comprising alternate heat reflecting and non-conducting layers.

6. An electric cooker comprising an oven, a plurality of spaced walls enveloping said oven and forming a series of heat insulating chambers or jackets, a series of alined doors therefor, electric resistance or heating coils in the upper and lower portions of said oven, respectively, the upper walls of said oven and said enveloping walls being provided with alined openings, lids for said openings, an outlet vent leading from the upper part of the oven, and inlet ports in the bottom of the oven and the intermediate enveloping wall.

7. An electric cooker comprising an oven, a plurality of spaced walls enveloping said oven and forming a series of heat insulating chambers or jackets, a series of alined doors therefor, electric resistance or heating coils in the upper and lower portions of said oven respectively, the upper walls of said oven and said enveloping walls being provided with alined openings, lids for said openings, an outlet vent leading from the upper part of the oven, inlet ports in the bottom of the oven and the intermediate enveloping wall, and a vent outlet connected with the intermediate chamber above the oven.

8. A cooker comprising an oven, provided with heat insulating walls, a heater in the lower part of the oven, a heater in the upper part of the oven and forming a division across the oven chamber and providing a frying or boiling compartment above said upper heater and within the oven inclosure, a cover for the oven above the frying compartment, a vent outlet connected with the oven, and an independent vent outlet connected with said compartment.

9. A cooker comprising an oven, provided with heat insulating walls, a heater in the lower part of the oven, a heater in the upper part of the oven and forming a division across the oven chamber and providing a frying or boiling compartment above said upper heater and within the oven inclosure, a vent outlet connected with the oven, a thermostat-operated switch included in circuit with the heaters, and means for causing the switch to operate at different temperatures to provide for a higher degree of heat when frying than when baking.

10. In an electric heating device, a heating unit, and means having parallel mirror-like surfaces for alternately reflecting the heat waves given off by said unit, both of said surfaces being arranged on the same side of said unit.

11. In an electric heating device, an electric heating unit, a metallic casing for the same and an outer metallic casing therefor having a highly polished surface facing the outer surface of said first mentioned casing.

12. In an electric heating device, a heating unit, a metallic member adjacent thereto having a highly polished outer surface, and a second metallic member having a highly polished surface opposite the polished surface of said member.

13. In an electric heater, in combination, a heating unit, and means for reducing the radiation loss therefrom comprising a plurality of walls adjacent to and on one side of said heating element, said walls being spaced apart and having their inner surfaces highly polished.

14. An apparatus of the class described, comprising a series of metallic casings of varying sizes nested one within the other and each spaced from the other so as to inclose air zones therebetween, the walls of the casings and the interposed air zones forming alternate heat-reflecting and non-conducting layers, and an electric temperature-changing device in the innermost casing.

In testimony whereof I have hereunto set my hand in presence of two subscribing witnesses.

WALTER RICHMOND.

Witnesses:
CHARLES N. MURRAY,
EDWIN S. CLARKSON.